(12) United States Patent
Patel et al.

(10) Patent No.: US 7,576,500 B2
(45) Date of Patent: Aug. 18, 2009

(54) METHOD AND SYSTEM FOR OPERATING A MOTOR TO REDUCE NOISE IN AN ELECTRIC VEHICLE

(75) Inventors: Nitinkumar R. Patel, Cypress, CA (US); Mohammad N. Anwar, Van Buren Township, MI (US); Silva Hiti, Redondo Beach, CA (US); Brian A Welchko, Torrance, CA (US); Steven E. Schulz, Torrance, CA (US); Lisa M. Talarico, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 267 days.

(21) Appl. No.: 11/756,349

(22) Filed: May 31, 2007

(65) Prior Publication Data

US 2008/0298785 A1    Dec. 4, 2008

(51) Int. Cl.
*H02P 1/00* (2006.01)
(52) U.S. Cl. .................. 318/139; 388/820; 701/22; 180/312
(58) Field of Classification Search ............. 318/139; 388/820; 701/22; 180/312
See application file for complete search history.

(56) References Cited

U.S. PATENT DOCUMENTS

| 5,332,061 | A  | * | 7/1994  | Majeed et al. ............. 180/312 |
| 5,694,304 | A  | * | 12/1997 | Telefus et al. ............ 363/21.03 |
| 6,840,341 | B2 | * | 1/2005  | Fujikawa ................. 180/65.25 |
| 7,126,299 | B2 | * | 10/2006 | Jackson ..................... 318/380 |
| 7,292,917 | B2 | * | 11/2007 | Kuang et al. ................. 701/22 |

\* cited by examiner

*Primary Examiner*—Bentsu Ro
*Assistant Examiner*—David S Luo

(57) ABSTRACT

Methods and systems for operating a motor coupled to an electrical bus in a vehicle are provided. Selected resonant frequencies of the electrical bus are determined. The selected resonant frequencies include a low resonant frequency and a high resonant frequency. Power is provided to the motor through at least one switch operating at a switching frequency. The switching frequency is controlled as a function of a rate of operation of the motor. The function is characterized by one of a first substantially linear portion having a first slope when the switching frequency is less than or equal to a selected switching frequency and a second substantially linear portion having a second slope if the switching frequency is greater than the selected frequency, the selected switching frequency being greater than the low resonant frequency and a substantially linear portion having a y-intercept being greater than the low resonant frequency.

20 Claims, 6 Drawing Sheets

US 7,576,500 B2

METHOD AND SYSTEM FOR OPERATING A MOTOR TO REDUCE NOISE IN AN ELECTRIC VEHICLE

TECHNICAL FIELD

The present invention generally relates to automobiles, and more particularly relates to a method and system for operating a motor to reduce noise in an electric vehicle, such as a hybrid automobile.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel vehicles, such as hybrid, electric, and fuel cell vehicles. Such alternative fuel vehicles typically use one or more electric motors, perhaps in combination with another actuator, to drive the wheels. Additionally, such automobiles may also include other motors, as well as other high voltage components, to operate the other various systems within the automobile, such as the air conditioner.

Due to the fact that alternative fuel automobiles typically include only a direct current (DC) power supply (e.g., a battery), voltage source (i.e., power) inverters are used to convert the DC power to alternating current (AC) power, which is generally required by the motors. The motors, power inverters, and the battery, as well as other components, are electrically interconnected through a series of conductors, such as cables, referred to as a "DC bus."

The power inverters convert DC power to AC power primarily by means of switching transistors therein, using for example, Pulse Width Modulation (PWM) techniques. The inverter switching frequencies often approach, and excite, various resonant frequencies in the DC bus, which may result in undesirable noise in the vehicle and high frequency current ripple on the DC bus.

Accordingly, it is desirable to provide a method and system for operating a motor coupled to an electrical bus such that the excitation of resonant frequencies is minimized. Furthermore, other desirable features and characteristics of the present invention will become apparent from the subsequent detailed description and the appended claims, taken in conjunction with the accompanying drawings and the foregoing technical field and background.

SUMMARY OF THE INVENTION

According to one embodiment, a method for operating a motor coupled to an electrical bus in a vehicle is provided. Selected resonant frequencies of the electrical bus are determined. The selected resonant frequencies include a low resonant frequency and a high resonant frequency. Power is provided to the motor through at least one switch operating at a switching frequency. The switching frequency is controlled as a function of a rate of operation of the motor. The function is characterized by one of a first substantially linear portion having a first slope when the switching frequency is less than or equal to a selected switching frequency and a second substantially linear portion having a second slope if the switching frequency is greater than the selected frequency, the selected switching frequency being greater than the low resonant frequency and a substantially linear portion having a y-intercept being greater than the low resonant frequency.

According to another embodiment, a method for operating a motor coupled to a power inverter and an electrical bus in a vehicle is provided. Selected resonant frequencies of the electrical bus are determined. The selected resonant frequencies include a low resonant frequency and a high resonant frequency. Power is provided to the motor through at least one switch within the power inverter. The providing of the power includes one of operating the at least one switch at an initial switching frequency to initiate the operation of the motor, the initial switching frequency being greater than the low resonant frequency, and operating the at least one switch at a switching frequency, increasing the switching frequency at a first rate as a function of a rate of operation of the motor if the switching frequency is less than or equal to a selected switching frequency, and increasing the switching frequency at a second rate as a function of the rate of operation of the motor if the switching frequency is greater than the selected frequency, the selected switching frequency being greater than the low resonant frequency.

According to a further embodiment, an automotive drive system is provided. The drive system includes an electrical bus having selected resonant frequencies, the selected resonant frequencies having a low resonant frequency and a high resonant frequency, a direct current (DC) power supply coupled to the electrical bus, an electric motor coupled to the electrical bus, a power inverter comprising at least one transistor and coupled to the electrical bus to receive DC power from the DC power supply and provide alternating current (AC) power to the electric motor, and a processor in operable communication with the electric motor, the DC power supply, and the inverter. The processor is configured to control the switching frequency as a function of a rate of operation of the motor. The function is characterized by one of a first substantially linear portion having a first slope when the switching frequency is less than or equal to a selected switching frequency and a second substantially linear portion having a second slope if the switching frequency is greater than the selected frequency, the selected switching frequency being greater than the low resonant frequency and a substantially linear portion having a y-intercept being greater than the low resonant frequency.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-10 are merely illustrative and may not be drawn to scale.

FIG. 1 to FIG. 10 illustrate a method and system for operating a motor coupled to an electrical bus in a vehicle. Selected resonant frequencies of the electrical bus are determined. The selected resonant frequencies include a low resonant frequency and a high resonant frequency. Power is provided to the motor through at least one switch operating at a switching frequency. The switching frequency is controlled as a function of a rate of operation of the motor. The function is characterized by one of a first substantially linear portion having a first slope when the switching frequency is less than or equal to a selected switching frequency and a second substantially linear portion having a second slope if the switching frequency is greater than the selected frequency, the selected switching frequency being greater than the low resonant frequency and a substantially linear portion having a y-intercept being greater than the low resonant frequency.

Figure 1:
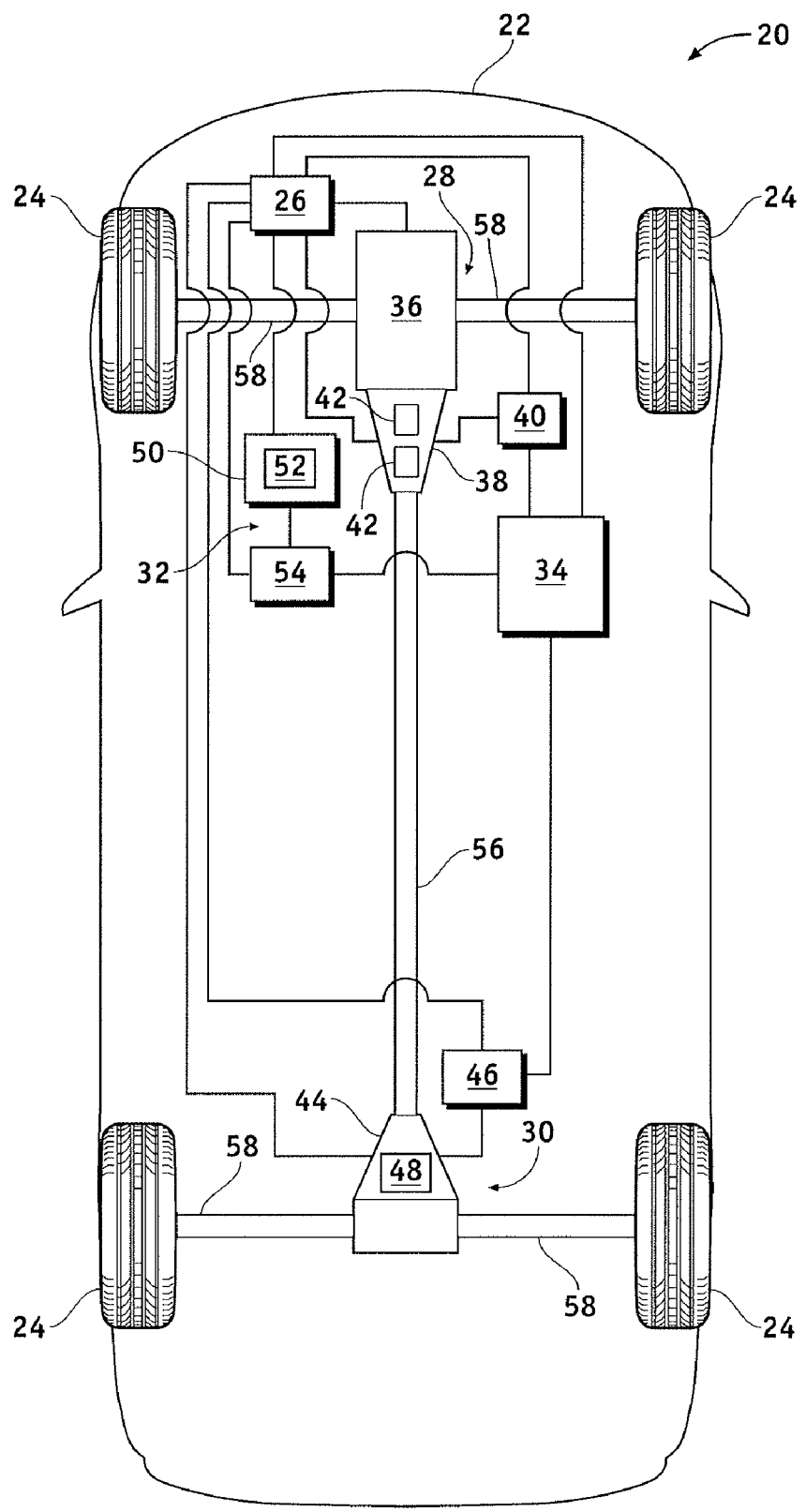
FIG. 1 is a schematic view of an exemplary vehicle according to one embodiment of the present invention.

FIG. 1 illustrates an electric vehicle (or automobile) 20, according to one embodiment of the present invention. The vehicle 20 includes a frame 22, four wheels 24, and an electronic control system 26. Although not specifically shown, the frame includes a chassis and a body arranged on the chassis that substantially encloses the other components of the vehicle 20. The wheels 24 are each rotationally coupled to the frame 22 near a respective corner thereof.

The vehicle 20 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 20 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 20 is an AWD hybrid vehicle, and further includes a forward actuator assembly 28, a rear actuator assembly 30, an air-conditioning (AC) system 32, and a battery (i.e., direct current (DC) power supply) 34. The forward actuator assembly 28 includes an internal combustion engine 36, a forward motor/transmission assembly 38, and a forward power inverter assembly 40 (or Traction Power Inverter Module (TPIM)), which includes, in one embodiment, includes multiple power inverters (i.e., one for each of the electric motors within the actuator assembly 28 described below).

The forward motor/transmission assembly 38 includes a transmission therein integrated with two electric motor/generators (or motors) 42, as is commonly understood, and is coupled to the combustion engine 36. Although not shown, each of the motor/generators 42 includes a stator assembly (including conductive coils) and a rotor assembly (including a ferromagnetic core). The stator assembly and/or the rotor assembly within the motor/generators 42 may include multiple electromagnetic poles (e.g., sixteen poles), as is commonly understood.

The rear actuator assembly 30 includes a rear motor/transmission assembly 44 and a rear power inverter 46 (or Rear Power Inverter Module (RPIM)). The rear motor/transmission assembly 44 includes an electric motor/generator 48, which may be similar to the motor/generators 42 of the forward motor/transmission assembly 38. The AC system 32 includes an AC unit 50 including an AC compressor motor 52 and an AC power inverter 54, and is used to regulate air temperature within a passenger compartment of the vehicle 20.

With continued reference to FIG. 1, the rear actuator assembly 30 is coupled to the forward actuator assembly 28 through a drive shaft 56, and each of the actuator assemblies 28 and 30 are coupled to the wheels 24 through multiple axles 58.

Figure 2:
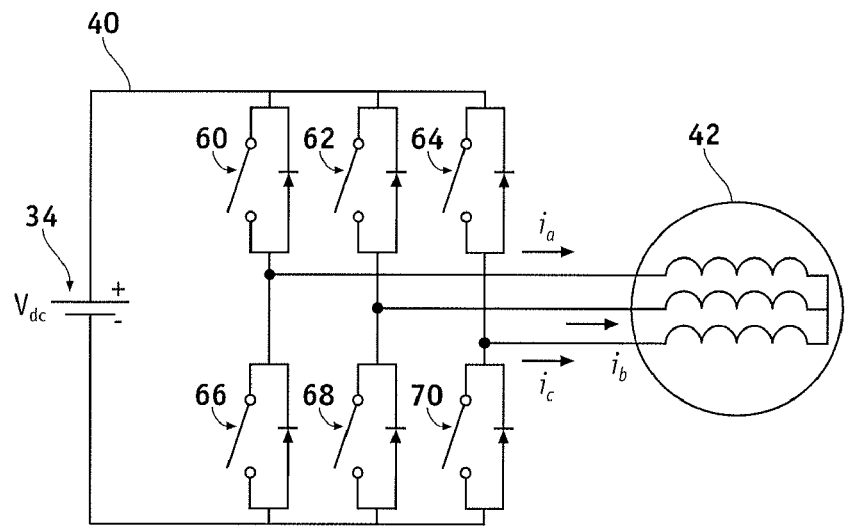
FIG. 2 is a schematic view of an inverter within the vehicle of FIG. 1.

FIG. 2 illustrates the forward power inverter assembly 40, or more particularly, a power inverter within the forward power inverter assembly 40, according to one embodiment. The inverter 40 includes a three-phase circuit coupled to a voltage source and a motor. More specifically, the inverter 40 includes a switch network having a first input coupled to the battery 34 and an output coupled to the motor/generator(s) 42. Although a single voltage source is shown, a distributed direct current (DC) link with two series sources may be used.

The switch network comprises three pairs of series switches with antiparallel diodes (i.e., antiparallel to each switch) corresponding to each of the phases. Each of the pairs of series switches comprises a first switch (or transistor) 60, 62, and 64 having a first terminal coupled to a positive electrode of the battery 34 and a second switch 66, 68, and 70 having a second terminal coupled to a negative electrode of the battery 34 and having a first terminal coupled to a second terminal of the respective first switch 60, 62, and 64. Although FIG. 2 is specified as illustrating an inverter within the forward power inverter assembly 40, is should be understood that FIG. 2 may also be used to depict the rear power inverter 46 and/or the AC power inverter 54, at least according to one embodiment.

Referring again to FIG. 1, the electronic control system 26 is in operable communication with the forward actuator assembly 28, the rear actuator assembly 30, the AC system 32, and the battery 34. Although not shown in detail, the electronic control system 26 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 3:
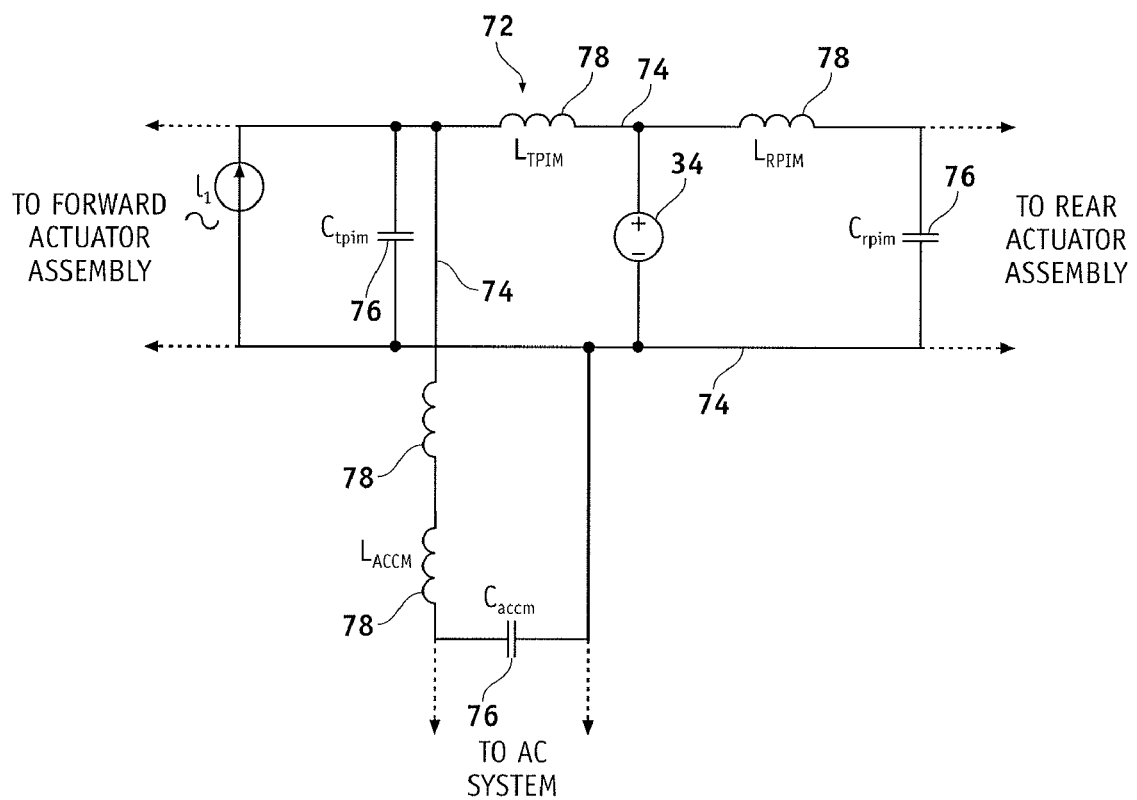
FIG. 3 is a schematic view of an electrical bus within the vehicle of FIG. 1.

FIG. 3 schematically illustrates a high voltage DC electrical bus (or electrical bus) 72 within the vehicle 20. As will be appreciated by one skilled in the art, the DC bus 72 includes multiple conductors 74 (e.g., busbars and/or wires or cables) that electrically interconnect the battery 34, the forward actuator assembly 28, the rear actuator assembly 30, and the AC system 32 (shown in FIG. 1). The DC bus 72 (and/or the various components interconnected therethrough) also includes various capacitors (e.g., X-Y capacitors) 76 and inductors (e.g., common-mode chokes and cable inductances) 78, as is commonly understood. It should also be understood that the vehicle 20, shown in FIG. 1, may include various other components that also share the DC bus 72, such as, an electric power steering inverter, DC-to-DC power converters, and other high-voltage components.

The various components coupled to the DC bus 72 have varying filter capacitances and inductances depending on individual design requirements, as well as X-Y capacitors and common-mode chokes for electro-magnetic compatibility. Additionally, the conductors interconnecting the various components add series inductances. Depending on the DC bus 72 layout, these inductances and capacitances form tank circuits that may have resonant frequencies which can be derived by:

$$f_{res} = \frac{1}{2\pi\sqrt{LC}}, \quad (1)$$

where L=inductance (Henries) and C=capacitance (Farads).

Depending on the particular DC bus layout and operational strategy, the system can have multiple tank circuits with multiple resonance frequencies. The self inductance, capacitance, and cable inductance values may vary part-to-part or vehicle-to-vehicle. As a result, the DC bus 72 has a range of resonant frequencies, as opposed to only one resonant frequency, at which certain components could provide a low impedance path for resonant current to flow if the DC bus 72 is excited within that range.

Figure 4:
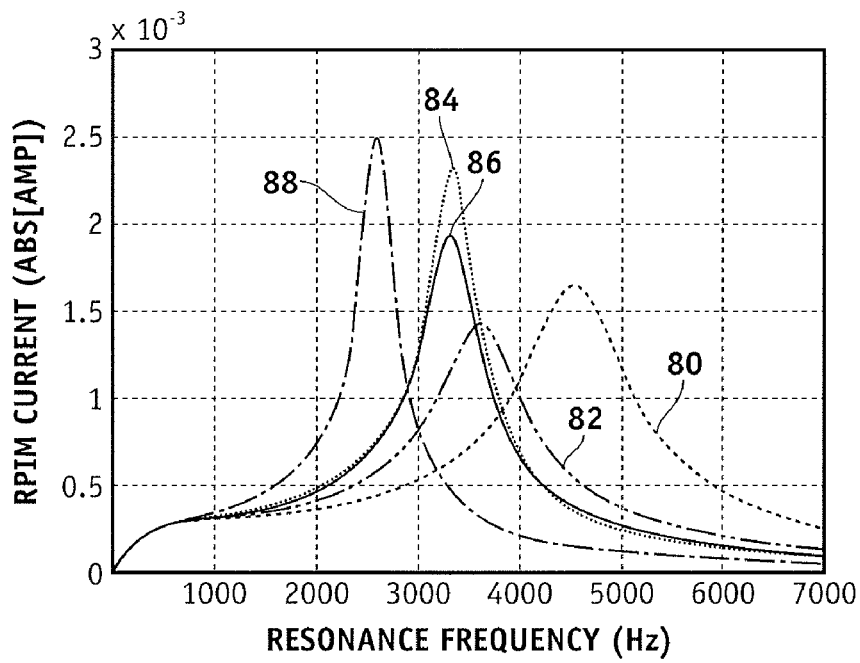
FIG. 4 is a graphical illustration of resonance phenomenon with respect to various inductance values across the electrical bus of FIG. 3.

FIG. 4 illustrates the resonance phenomenon respect to various inductance values 80-88 across the DC bus 72 shown in FIG. 3, as measured at the rear power inverter due to the operation of the forward power inverter. Referring to FIGS. 3 and 4 in combination, the inductance value 80 corresponds to a forward inverter cable inductance ($L_{TPIM}$) of 2.5 µH, a rear inverter cable inductance ($L_{RPIM}$) of 1.1 µH, and an AC motor series inductance ($L_{ACCM}$) of 7.8 µH. The inductance value 82 corresponds to a $L_{TPIM}$ of 4.4 µH, a $L_{RPIM}$ of 1.1 µH, and a $L_{ACCM}$ of 7.8 µH. The inductance value 84 corresponds to a $L_{TPIM}$ of 4.4 µH, a $L_{RPIM}$ of 2.2 µH, and a $L_{ACCM}$ of 11.8 µH. The inductance value 86 corresponds to a $L_{TPIM}$ of 4.4 µH, a $L_{RPIM}$ of 2.2 µH, and a $L_{ACCM}$ of 7.8 µH. The inductance value 88 corresponds to a $L_{TPIM}$ of 6.5 µH, a $L_{RPIM}$ of 4.4 µH, and a $L_{ACCM}$ of 7.8 µH. As shown, the resonant current of inductance values peak approximately between resonant frequencies of 2500 Hz (or low resonant frequency) and 4800 Hz (or high resonant frequency).

During operation, referring again to FIG. 1, the vehicle 20 is operated by providing power to the wheels 24 with the combustion engine 36 and the electric motors 42 and 48 in an alternating manner and/or with the combustion engine 36 and the electric motors 42 and 48 simultaneously. Additionally, the AC compressor motor 52 is used in the operation of the AC system 32 to regulate the temperature within the passenger cabin of the vehicle 20. In order to power the motors 42, 48, and 52, DC power is provided from the battery 34 to the respective inverters 40, 46, and 54, which convert the DC power into AC power, before the power is sent to the motors 42, 48, and 52. As will be appreciated by one skilled in the art, within each inverter the conversion of DC power to AC power is substantially performed by operating (i.e., repeatedly switching) the transistors 60-70 at a "switching frequency," such as, for example, between 2 and 12 kilohertz (kHz). The switching of the transistors 60-70 may be controlled by a controller and a modulator integral with the electronic control system 26 shown in FIG. 1.

Figure 5:
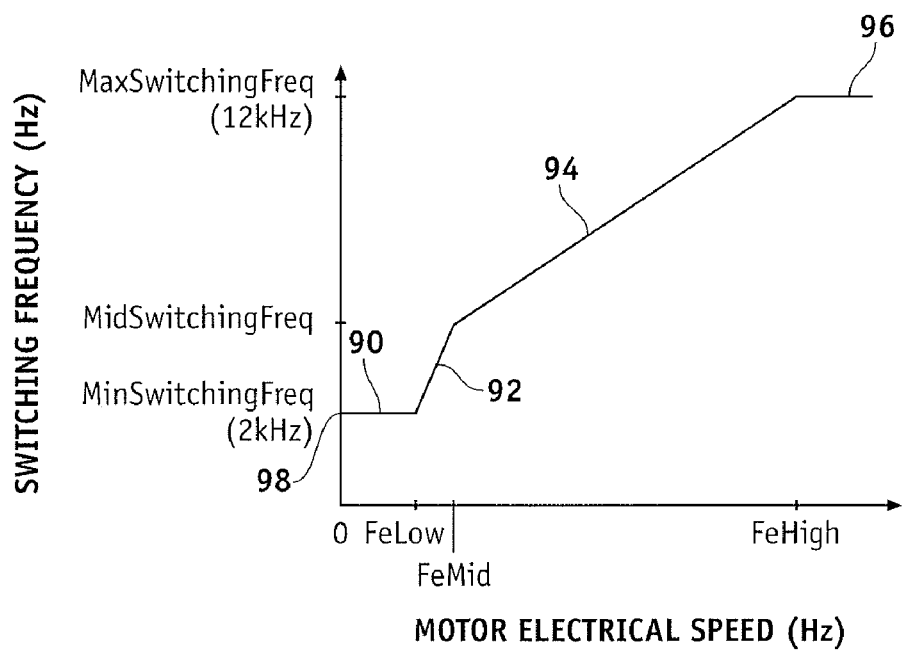
FIG. 5 is a graphical illustration of a method for operating a motor in accordance with one embodiment of the present invention.

FIG. 5 illustrates a method for operating a motor in accordance with one embodiment of the present invention. More particularly, FIG. 5 is a graphical illustration of an example of a controlled switching frequency of a power inverter as a function of a rate of operation (electrical frequency or motor speed) of a motor to which it is supplying AC power, which may be implemented by the electronic control system 26 in controlling the operation of one of the inverters 40, 46, and 54 shown in FIG. 1. As shown in FIG. 5, the function includes several linear segments (or portions) 90, 92, 94, and 96, each of which corresponds to particular motor speeds and switching frequencies and has a particular slope.

Specifically, a "low" segment 90 extends from a "y-intercept" 98 of the function (i.e., corresponding to a motor speed of zero) at a minimum switching frequency ("MinSwitchingFreq") of 2 kHz. The low segment 90 extends to a first break point in the motor speed at "FeLow." As shown, the switching frequency in the low segment 90 is constant (i.e., has a slope of 0). In other words, between no motor rotation and FeLow, the switching frequency remains at MinSwitchingFreq, or 2 kHz. Thus, during operation, when the motor speed is increased above zero, the switching frequency remains at the minimum switching frequency until the motor speed reaches FeLow (i.e., does not increase). It should be noted that the minimum switching frequency is less than the low resonant frequency (i.e., 2500 Hz) of the DC bus 72.

A "low-mid" segment 92 extends from an end of the low segment 90 at the motor speed FeLow to a second break point in the motor speed at "FeMid." The low-mid segment 92 increases to a mid-switching frequency ("MidSwitchingFreq") (e.g., 5 kHz) at a relatively high rate (i.e., has a relatively steep (or high) positive slope).

Of particular interest in the low-mid segment 92 is the relatively high slope thereof and the range of switching frequencies covered. Specifically, the range of switching frequencies between MinSwitchingFreq and MidSwitchingFreq covers the range of resonant frequencies shown in FIG. 4. Therefore, as the motor speed increases, the switching frequency passes through the range of resonant frequencies shown in FIG. 4 relatively quickly. It should be noted that the mid-switching frequency is greater than high resonant frequency (i.e., 4800 Hz) of the DC bus 72.

A "mid-high" segment 94 extends from an upper end of the low-mid segment 92 to a third break point in the motor speed at "FeHigh," while increasing to the maximum switching frequency ("MaxSwitchingFreq") (e.g., 12 kHz) at a lower rate than the low-mid segment 92. That is, the mid-high segment 94 has a positive slope that is less than the slope of the low-mid segment 92. Therefore, as the motor speed increases, after increasing beyond MidSwitchingFreq, when compared to the low-mid segment 92, the switching frequency increases at a lower rate relative to the motor speed.

A "high" segment 96 extends from an upper end of the mid-high segment 96 and has a slope of 0. That is, after reaching the maximum switching frequency, the switching frequency is not increased any further, regardless of any further increases in motor speed.

Figure 6:
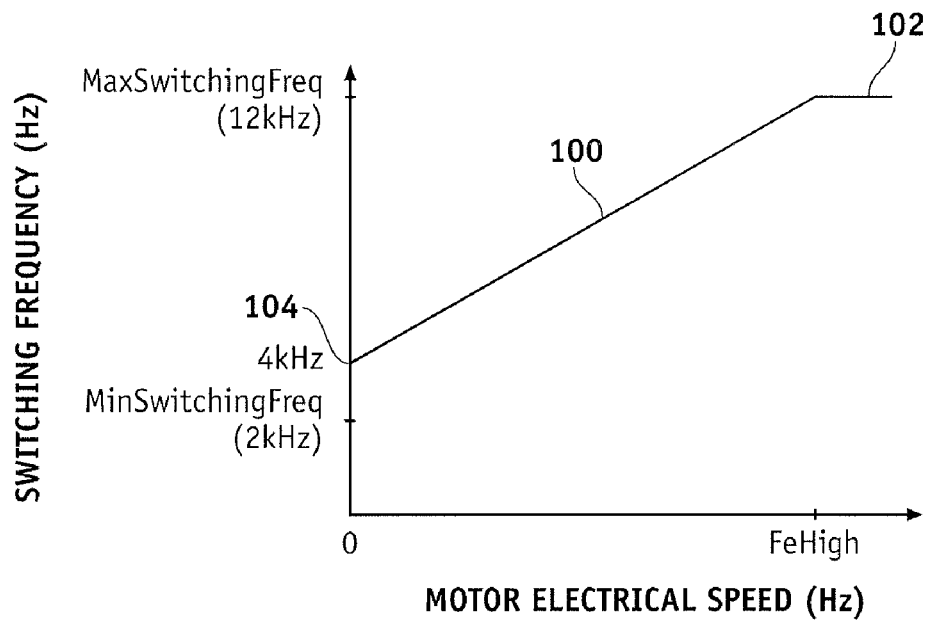
FIG. 6 is a graphical illustration of a method for operating a motor in accordance with another embodiment of the present invention.

FIG. 6 illustrates a method, or function, for operating a motor in accordance with another embodiment of the present invention. As shown, the function includes two linear segments (or portions) 100 and 102, each of which corresponds to particular motor speeds and switching frequencies and has a particular slope.

Specifically, a "low-high" segment 100 extends from a "y-intercept" 104 of the function (i.e., corresponding to a motor speed of zero) at an initial switching frequency of, for example, approximately 4 kHz. The low-high segment 100 extends to a high motor speed at "FeHigh" and a maximum switching frequency ("MaxSwitchingFreq") (e.g., 12 kHz) with a slope similar to that of the mid-high segment 94 shown in FIG. 5. Thus, when motor operation is initiated, as the motor speed increases above zero, the switching frequency begins at 4 kHz, and immediately begins to increase with the motor speed.

Of particular interest in the low-high segment 100 is the relatively high y-intercept 104 thereof and its relationship to the range of resonant frequencies shown in FIG. 4. Specifically, in the function shown in FIG. 6, the lowest switching frequency used (i.e., at the y-intercept 104) is well above the low end of the range of resonant frequencies shown in FIG. 4. Therefore, when motor operation is initiated and the motor speed increases, the switching frequency "bypasses" a portion the range of resonant frequencies shown in FIG. 4. As a result, as the motor speed continues to increase, the switching frequency passes out of the range of the resonant frequencies relatively quickly.

A "high" segment 102 extends from an upper end of the low-high segment 100 and has a slope of 0. That is, after reaching the maximum switching frequency, the switching frequency is not increased any further, regardless of any further increases in motor speed.

One advantage of the method and system described above is that because the slope at particular portions of the switching frequency function, and/or the y-intercept of the switching frequency function, the switching frequencies that excite the resonant frequencies of the DC bus are at least partially "tuned out." That is, because of the slope and/or the y-intercept of the switching frequency function, the amount of time that the particular inverter operates at switching frequencies that may excite the DC bus resonant frequencies is reduced. As a result, the likelihood that any such resonant frequencies are excited, which may result in undesirable noise within the passenger cabin, is minimized.

Figure 7:
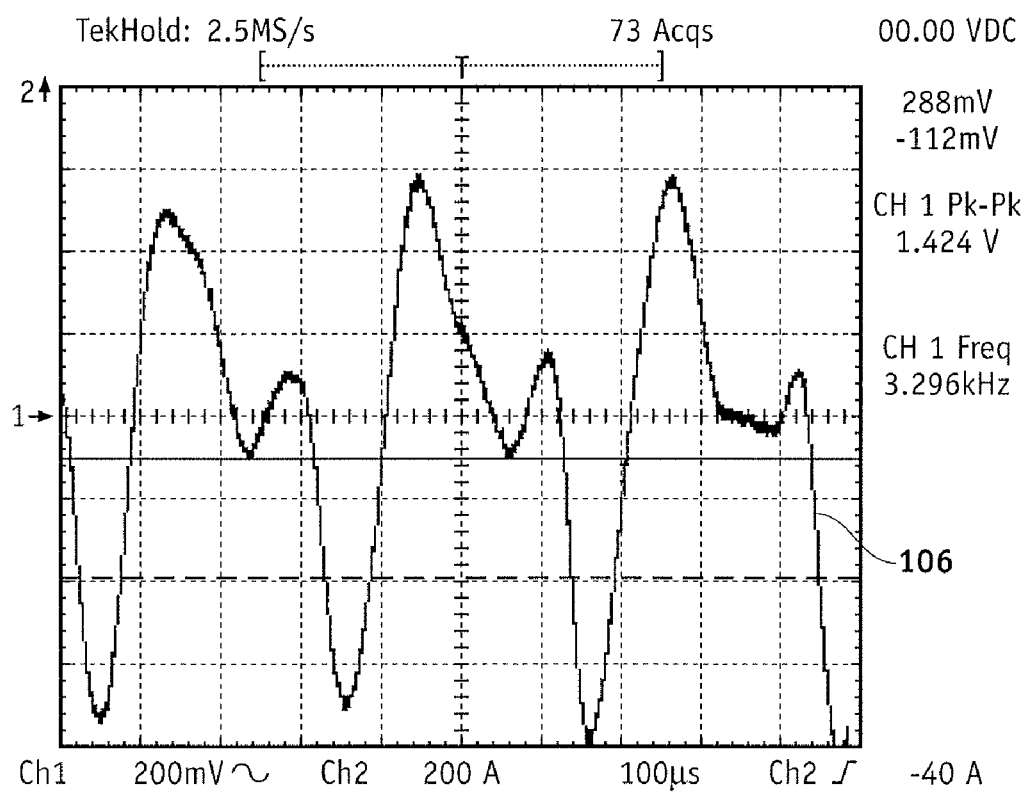
FIG. 7 is a graphical illustration of an example of a high frequency ripple current measured on an electrical bus during operation of a power inverter utilizing a conventional switching frequency function.
Figure 8:
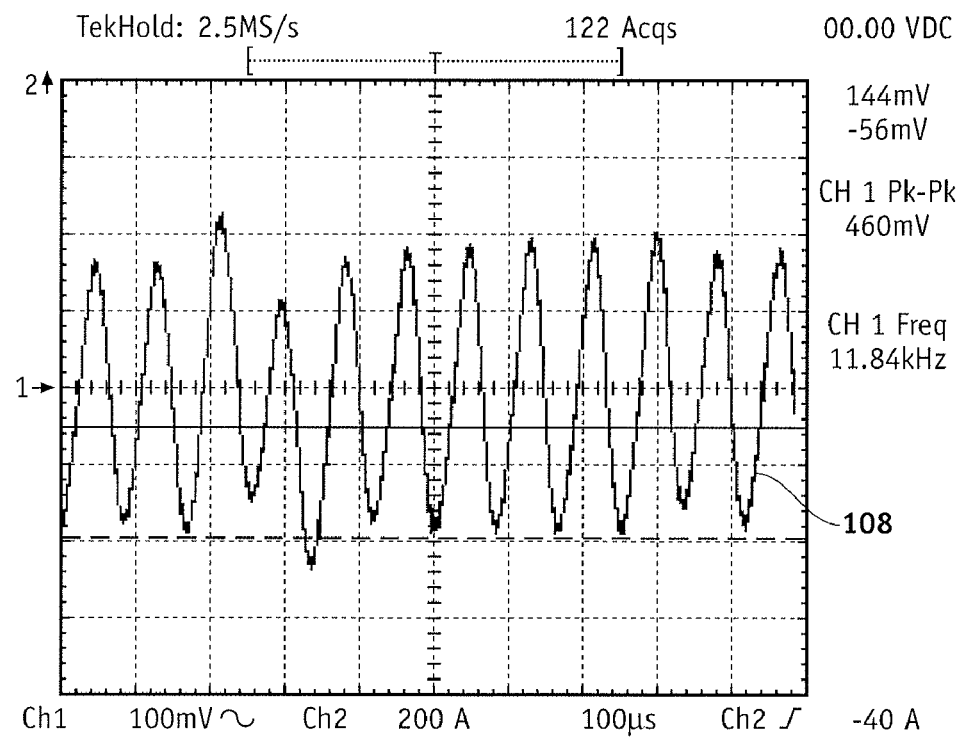
FIG. 8 is a graphical illustration of an example of a high frequency ripple current measured on an electrical bus during operation of a power inverter utilizing a switching frequency function according to an embodiment of the present invention.

FIG. 7 graphically illustrates an example of a high frequency ripple current 106 measured on a DC bus during operation of a power inverter utilizing a conventional switching frequency function. Using the conventional switching frequency function, the high frequency ripple current 106 is present at a frequency of approximately 3.29 kHz with a peak current of 160 Apk-pk. Such a ripple current cause a high pitch audible acoustic noise in the vehicle. FIG. 8 illustrates an example of a high frequency ripple current 108 measured on a DC bus during operation of a power inverter utilizing a switching frequency function according to an exemplary embodiment of the present invention. The ripple current 108 present has a frequency of approximately 11.8 kHz with a peak current of 51 Apk-pk. The frequency of the ripple current 108 in FIG. 8 falls outside of the DC bus resonant frequencies, as described above, and thus audible noise is reduced.

According to an additional aspect of the present invention, a dithering technique may be applied to the PWM switching which can effectively spread the frequency spectrum, thus reducing the peak amplitude of emissions at the discrete harmonic frequencies of the switching frequency. In this manner, the peak emissions can be reduced, which can result in lowered acoustic noise from the motor, as well as minimizing excitation amplitude with respect to the DC bus resonances.

To implement the dithering algorithm, the PWM frequency is randomly varied at a lower rate (for example, the PWM frequency is modified every 10 msec). A random variation is introduced into the PWM frequency, which effectively spreads the spectrum of the voltage and currents produced by the inverter and motor. Mathematically, this can be represented as $$T_0 = T_{nom} - (frn * T_{dither}) \quad (2)$$

$$0 \leq frn \leq 1$$

where $T_0$ is the actual switching period, Tnom is the nominal switching period, $T_{dither}$ is the maximum dither span, and frn is a pseudo random number. During operation, the electronic control system 26 updates the switching frequency per Equation 2 at the specified dither rate, which may be 10 msec, as mentioned above.

Figure 9:
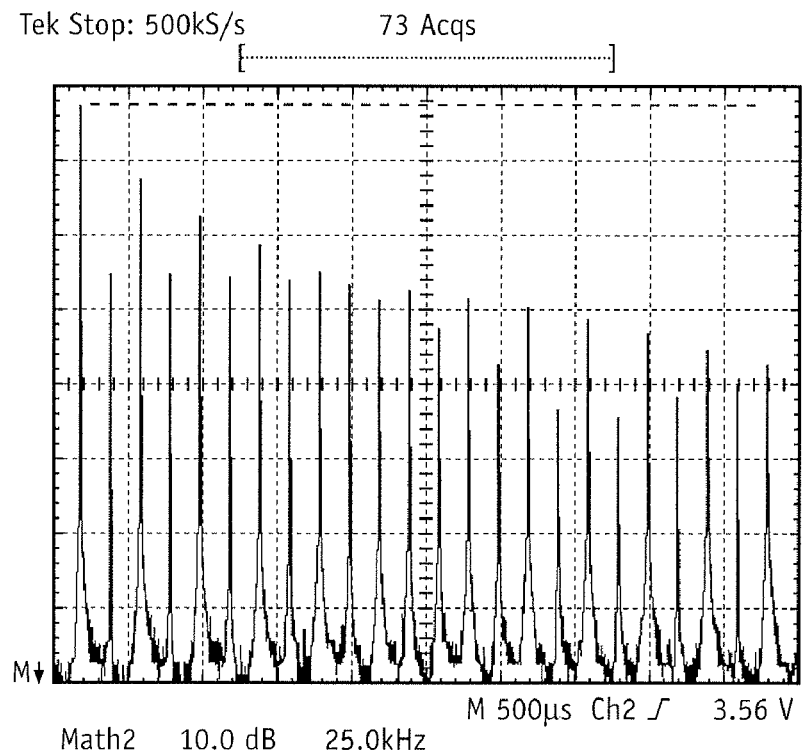
FIG. 9 is a graphical illustration of the frequency spectrum of a output voltage of a power inverter using fixed frequency PWM.
Figure 10:
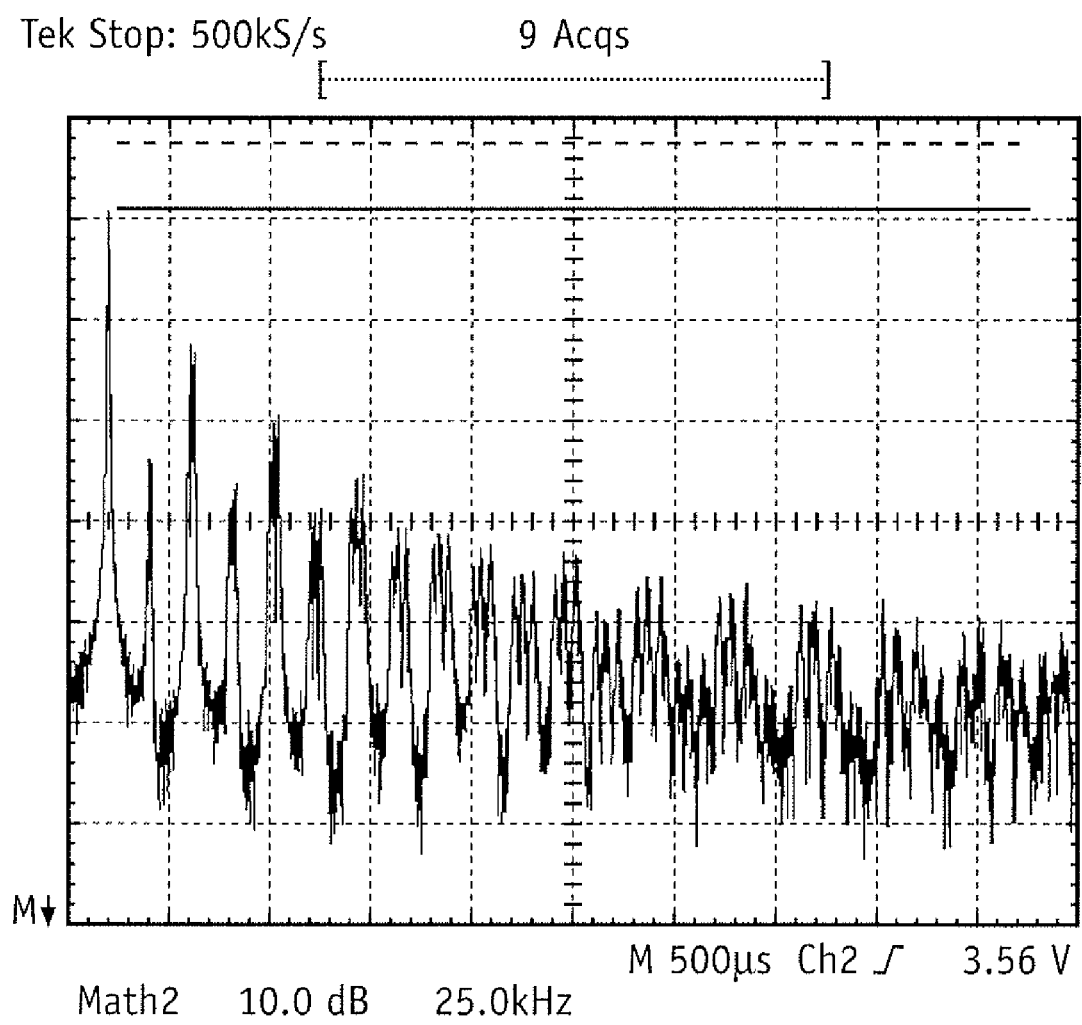
FIG. 10 is a graphical illustration of the frequency spectrum of an output voltage of a power inverter using PWM with a dithering technique applied.

FIGS. 9 and 10 illustrate the effect of dithering the PWM frequency. FIG. 9 demonstrates the frequency spectrum of the output voltage 110 of a voltage source inverter using fixed frequency PWM at 10 kHz. Notice the strong components at the discrete harmonics of the PWM frequency. FIG. 10 shows the spectrum where dithering is employed. Note that the peaks of the harmonics have been reduced in amplitude, due to the frequency spreading effect.

Thus, using the proposed solution the DC bus resonance is reduced by varying the inverter switching frequency with respect to the motor electrical speed and dithering the PWM.

An additional advantage of applying the dithering technique to the switching frequency functions described above is that the peak amplitude of emissions at the discrete harmonic frequencies of the switching frequency is reduced. As a result, the excitation amplitude with respect to DC bus resonances may be further minimized and acoustic noise from the motor may be further reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a motor coupled to an electrical bus in a vehicle comprising:
   determining selected resonant frequencies of the electrical bus, the selected resonant frequencies having a low resonant frequency and a high resonant frequency;
   providing power to the motor through at least one switch operating at a switching frequency; and
   controlling the switching frequency as a function of a rate of operation of the motor, the function characterized by one of:
   a first substantially linear portion having a first slope when the switching frequency is less than or equal to a selected switching frequency and
   a second substantially linear portion having a second slope if the switching frequency is greater than the selected switching frequency, the selected switching frequency being greater than the low resonant frequency; and
   a substantially linear portion having a y-intercept greater than the low resonant frequency.

2. The method of claim 1, wherein the function is characterized by the first substantially linear portion having a first slope when the switching frequency is less than or equal to the selected switching frequency and the second substantially linear portion having a second slope if the switching frequency is greater than the selected frequency, and wherein the selected switching frequency is greater than or equal to the high resonant frequency.

3. The method of claim 2, wherein the function further comprises a third substantially linear portion having a third slope when the switching frequency is less than a second selected switching frequency.

4. The method of claim 3, wherein the second selected switching frequency is less than or equal to the low resonant frequency.

5. The method of claim 4, wherein the first slope is greater than the second and third slopes.

6. The method of claim 5, wherein the second slope is greater than the third slope.

7. The method of claim 6, wherein the third slope is substantially zero.

8. The method of claim 1, wherein the function is characterized by the substantially linear portion having a y-intercept being greater than the low resonant frequency, and wherein the y-intercept is greater than 2 kilohertz (kHz).

9. The method of claim 8, wherein the substantially linear portion has a slope greater than zero at the y-intercept.

10. The method of claim 7, wherein the at least one switch is a transistor within a power inverter coupled to the motor and the electrical bus.

11. A method for operating a motor coupled to a power inverter and an electrical bus in a vehicle comprising:
    determining selected resonant frequencies of the electrical bus, the selected resonant frequencies having a low resonant frequency and a high resonant frequency; and
    providing power to the motor through at least one switch within the power inverter, the providing comprising one of
    operating the at least one switch at an initial switching frequency to initiate the operation of the motor, the initial switching frequency being greater than the low resonant frequency, and
    operating the at least one switch at a switching frequency, increasing the switching frequency at a first rate as a function of a rate of operation of the motor if the switching frequency is less than or equal to a selected switching frequency, and increasing the switching frequency at a second rate as a function of the rate of operation of the motor if the switching frequency is greater than the selected frequency, the selected switching frequency being greater than the low resonant frequency.

12. The method of claim 11, wherein the providing of the power comprises the operating the at least one switching at the initial switching frequency to initiate the operation of the motor and the initial switching frequency is greater than 2 kilohertz (kHz).

13. The method of claim 12, wherein the initiation of the operation of the motor comprises increasing a rate of operation of the motor from zero revolutions per minute (RPM) to greater than zero RPM.

14. The method of claim 11, wherein the providing of the power comprises operating the at least one switch at a switching frequency, increasing the switching frequency at a first rate as a function of a rate of operation of the motor if the switching frequency is less than or equal to a selected switching frequency, and increasing the switching frequency at a second rate as a function of the rate of operation of the motor if the switching frequency is greater than the selected frequency, the first rate being greater than the second rate.

15. The method of claim 14, wherein the providing of the power comprises increasing the switching frequency at a third rate as a function of the rate of operation of the motor if the switching frequency is less than a second selected switching frequency, the third rate being less than the second rate and the second selected switching frequency being less than or equal to the low resonant frequency.

16. An automotive drive system comprising:
    an electrical bus having selected resonant frequencies, the selected resonant frequencies having a low resonant frequency and a high resonant frequency;
    a direct current (DC) power supply coupled to the electrical bus;
    an electric motor coupled to the electrical bus;
    a power inverter comprising at least one transistor and coupled to the electrical bus to receive DC power from the DC power supply and provide alternating current (AC) power to the electric motor; and
    a processor in operable communication with the electric motor, the DC power supply, and the inverter, the processor being configured to:
    control the switching frequency as a function of a rate of operation of the motor, the function characterized by one of:
    a first substantially linear portion having a first slope when the switching frequency is less than or equal to a selected switching frequency and
    a second substantially linear portion having a second slope if the switching frequency is greater than the selected frequency, the selected switching frequency being greater than the low resonant frequency; and
    a substantially linear portion having a y-intercept being greater than the low resonant frequency.

17. The automotive drive system of claim 16, wherein the function comprises the first substantially linear portion having a first slope when the switching frequency is less than or equal to a selected switching frequency and the second substantially linear portion having a second slope if the switching frequency is greater than the selected frequency, the selected switching frequency is greater than or equal to the high resonant switching frequency, and the function further comprises a third substantially linear portion having a third slope when the switching frequency is less than a second selected switching frequency.

18. The method of claim 17, wherein the second selected switching frequency is less than or equal to the low resonant frequency, the first slope is greater than the second and third slopes, and the second slope is greater than the third slope.

19. The method of claim 16, wherein the function comprises the substantially linear portion having a y-intercept being greater than the low resonant frequency, and wherein the y-intercept is greater than 2 kilohertz (kHz).

20. The method of claim 19, wherein the substantially linear portion has a slope greater than zero at the y-intercept.

* * * * *